United States Patent
Eiselt et al.

(10) Patent No.: US 10,355,784 B2
(45) Date of Patent: Jul. 16, 2019

(54) METHOD AND OPTICAL TRANSMITTER DEVICE FOR CREATING AN OPTICAL BINARY DIGITAL TRANSMIT SIGNAL

(71) Applicant: ADVA Optical Networking SE, Meiningen (DE)

(72) Inventors: Michael Eiselt, Kirchheim (DE); Christoph Wagner, Eindhoven (NL)

(73) Assignee: ADVA Optical Networking SE, Meiningen (DE)

( * ) Notice: Subject to any disclaimer, the term of this patent is extended or adjusted under 35 U.S.C. 154(b) by 0 days.

(21) Appl. No.: 15/685,141

(22) Filed: Aug. 24, 2017

(65) Prior Publication Data
US 2018/0069635 A1 Mar. 8, 2018

(30) Foreign Application Priority Data
Sep. 2, 2016 (EP) .................................... 16187142

(51) Int. Cl.
*H04B 10/516* (2013.01)
*H04J 14/02* (2006.01)
*H04B 10/50* (2013.01)
*H04B 10/556* (2013.01)

(52) U.S. Cl.
CPC ......... *H04B 10/516* (2013.01); *H04B 10/504* (2013.01); *H04B 10/556* (2013.01); *H04J 14/02* (2013.01)

(58) Field of Classification Search
CPC .. H04B 10/516; H04B 10/556; H04B 10/504; H04J 14/02

USPC ......................................................... 398/183
See application file for complete search history.

(56) References Cited

U.S. PATENT DOCUMENTS

| 5,243,608 | A | 9/1993 | Chawki et al. | |
| 6,115,173 | A * | 9/2000 | Tanaka | H04B 10/2935 |
| | | | | 359/333 |
| 2004/0190828 | A1 * | 9/2004 | Boettcher | G02B 6/2932 |
| | | | | 385/37 |
| 2004/0208645 | A1 | 10/2004 | Buckman | |
| 2005/0271392 | A1 | 12/2005 | Matsui et al. | |
| 2006/0239609 | A1 * | 10/2006 | Sorin | H04J 14/02 |
| | | | | 385/24 |
| 2008/0089687 | A1 * | 4/2008 | Lee | H04J 14/0226 |
| | | | | 398/72 |
| 2010/0027934 | A1 * | 2/2010 | Shimizu | G02F 1/0327 |
| | | | | 385/2 |

(Continued)

*Primary Examiner* — Juan A Torres
(74) *Attorney, Agent, or Firm* — The Webb Law Firm

(57) ABSTRACT

A method for creating an optical binary digital transmit signal to be supplied to an optical transmission link including: operating an optical transmitter in such a state that mode hopping occurs between a predefined first and a predefined second optical mode of the optical transmitter if a binary digital modulation signal is supplied to the optical transmitter and creating a modulated optical output signal of the optical transmitter corresponding to the binary digital modulation signal supplied to the optical transmitter. The modulated optical output signal is optically filtered in such a way that at least a portion of the optical power spectrum of the modulated optical output signal caused by a selected one of the first and second optical modes is suppressed or at least substantially attenuated.

22 Claims, 5 Drawing Sheets

(56) References Cited

U.S. PATENT DOCUMENTS

| | | | |
|---|---|---|---|
| 2010/0278535 A1* | 11/2010 | Kim | H04B 10/272 |
| | | | 398/72 |
| 2012/0082469 A1* | 4/2012 | Xia | H04B 10/071 |
| | | | 398/196 |
| 2012/0213519 A1* | 8/2012 | Lee | H04B 10/506 |
| | | | 398/72 |
| 2013/0016972 A1* | 1/2013 | Zheng | H04J 14/02 |
| | | | 398/71 |
| 2014/0223218 A1* | 8/2014 | Cook | G01R 21/133 |
| | | | 713/340 |

* cited by examiner

METHOD AND OPTICAL TRANSMITTER DEVICE FOR CREATING AN OPTICAL BINARY DIGITAL TRANSMIT SIGNAL

CROSS-REFERENCE TO RELATED APPLICATION

This application claims priority to European Patent Application No. 16 187 142.1 filed Sep. 2, 2016, the disclosure of which is hereby incorporated in its entirety by reference.

BACKGROUND OF THE INVENTION

Field of the Invention

The present invention relates to a method for creating an optical binary digital transmit signal exploiting intentional mode hops and to an optical transmitter device for creating at least one optical binary digital transmit signal to be supplied to an optical transmission link for realizing this method.

Description of Related Art

In the field of optical telecommunication, optical transmission methods and respective optical transmitter devices matching the need of more and more increasing bit rates are required. Semiconductor lasers are mainly used as electro-optical conversion elements in optical transmitters. Direct modulation of a semiconductor laser induces chirp, that is dynamic wavelength changes, during modulation. This results in an undesired broadening of the optical signal spectrum and, in turn, to a reduced chromatic dispersion tolerance of a digital optical transmit signal that is created in this way. Typically, modulating a semiconductor laser, for example a DFB or DBR laser, at a modulation rate (symbol rate) of 10 Gb/s (10 GBaud) results in a dispersion tolerance corresponding to 10 km or less when using a standard single mode fiber (according to Recommendation ITU-T G.652) in the 1550 nm wavelength range.

Generally, for modulation rates of higher than approximately 4 Gb/s, externally modulated lasers are usually used instead of directly modulated lasers in order to overcome or reduce these problems. While in a semiconductor laser phase and power of the optical signal are related by a (fixed) ratio, namely the line width enhancement factor alpha, in external modulators, for example Mach-Zender modulators or electro-absorption modulators (EAM), the phase modulation can be controlled and can be reduced to zero, leaving amplitude modulation of the optical carrier only.

However, using external modulators in optical transmission systems adds complexity and cost as compared to the use of directly modulated lasers.

According to a further known method, the interaction current of a DFB laser is modulated with a small amplitude. This method is known as "chirp managed laser" and results in a relatively small extinction ratio and a frequency shift of the optical signals between mark and space bits on the order of half the modulation data rate. After the laser, a steep-edged optical filter is required, which suppresses the power in the space bits in order to increase the extinction ratio and to reduce the spectral width of the modulated optical signal.

This method, however, requires a costly optical filter and a tight control of the temperature of the laser in order to exactly match the laser wavelength with the edge of the optical filter.

The U.S. Pat. No. 5,243,608 describes an optical transmission process by wavelength shifting and a corresponding system. In this optical transmission system, intentional wavelength hopping or mode hopping is used in order to create a modulated optical binary digital transmit signal which is supplied to an optical transmission link. This modulation technique is called wavelength shift (WSK). The wavelength shift is obtained by a careful choice of the currents injected into the multiple-section semiconductor structures of the semiconductor lasers. The complete modulated signal is supplied to the optical transmission link and received, at the receiver side, by direct detection, wherein prior to the opto-electrical conversion elements an optical band-pass filter is used, in order to extract from the optical signal received the wavelength range comprising the center wavelength of a selected one of the modes between which the mode hopping occurs.

Thus, dispersion introduced by the optical transmission link, which may be a standard single-mode fiber, influences the transmission quality and thus the bit error rate of a respective transmission system.

It is therefore an object of the present invention to provide a method for creating an optical binary digital transmit signal to be supplied to an optical transmission link, especially to an optical wavelength division multiplex (WDM) transmission link, which reveals an improved dispersion tolerance. It is a further object of the present invention to provide an optical transmitter device realizing the method according to the invention.

SUMMARY OF THE INVENTION

The invention achieves these objects by providing a method for creating an optical binary digital transmit signal to be supplied to an optical transmission link and an appropriate optical transmitter device.

According to the present invention, an optical transmitter is operated in such a state that mode hopping occurs between a predefined first and a predefined second optical mode of the optical transmitter if a binary digital modulation signal is supplied to the optical transmitter device. In this way, a modulated optical output signal output by the optical transmitter is created, which corresponds to the binary digital modulation signal supplied to the optical transmitter, wherein a first state of the binary digital modulation signal leads to an optical output signal at a center wavelength of the first optical mode and a second state of the binary digital modulation signal leads to an optical output signal at a center wavelength of the second optical mode. In order to improve the dispersion tolerance, the modulated optical output signal is filtered in such a way that at least a portion of the optical power spectrum of the modulated optical output signal caused by a selected one of the first and second optical modes is suppressed or at least substantially attenuated. Thus, the dispersion introduced by the optical transmission link, especially by an optical fiber, cannot affect filtered signal portions comprising the center frequency of the respective (filtered) mode and the spectral components depending on the binary digital modulation signal. This leads to an improved extinction ratio of the detected receive signal as compared to the method disclosed in U.S. Pat. No. 5,243,608, according to which an optical band-pass filter is provided in the reception module.

It shall be noted that "at least substantially attenuating" a portion of the optical power spectrum of the modulated optical output signal caused by a selected one of the first and second optical modes means that the filtered signal, i.e. the optical binary digital transmit signal to be supplied to the optical transmission link, has a substantially lower peak in the optical power spectrum than the peak caused by the non-selected optical mode. A "substantially lower peak"

means that the signal directly detected by the receiver reveals a sufficiently high extinction ratio.

According to an embodiment of the invention, the optical mode causing a lower peak in the optical power spectrum is selected for effecting the optical filtering of the modulated optical output signal. This leads to a better extinction ratio as compared to selecting the mode causing the higher peak.

It shall be noted that the mode hopping effect is essentially caused or influenced by two parameters, which both depend on the gain current $I_{gain}$, namely the temperature and the charge carrier density in the active region of the semiconductor laser 3. Both parameters influence the phase. The "charge carrier effect" is dominant for higher bit rates, e.g. for bit rates above 4 to 6 Gbit/s depending on the design of the semiconductor laser. The "temperature effect" is dominant in for lower bit rates, e.g below 4 to 6 Gb/s.

Thus, especially at lower bit rates, i.e. in a bit rate range in which both effects contribute to effect a phase change, a larger phase change is possible for a given modulation index. Especially in this case not only (but not limited thereto) mode hopping not only between two neighboring modes but between modes which are spaced by one or more modes may be used.

If two non-neighbored modes are used for the mode hopping modulation, a stepwise transition occurs between the mode representing the actual (mark or space) bit and the mode representing the following (space or mark) bit, wherein also the one or more intermediate modes, which do not represent a valid bit in the binary modulating signal $S_{mod}$, exist for a given short time (significantly smaller than the bit interval). Also in this case, applying an optical filtering at the transmitter side in such a way that merely the optical spectrum of one of the modes (which are assigned to the two states of the binary optical modulation signal) is transmitted (whereas the rest of the spectrum is suppressed or at least sufficiently attenuated) results in an enhanced extinction ratio. Further, as compared to a mode hopping modulation method using two neighboring modes, the design of the optical filter is simplified.

In a further embodiment, an optical filter device is used for optically filtering the modulated optical output signal, which defines a channel bandwidth of the optical transmission link that is assigned to the optical binary digital transmit signal. Usually, such an optical channel filter is already present in an optical transmission system, which provides an optical channel having a restricted optical bandwidth only for transmitting an optical signal. Thus, the method according to the invention does, in such a case, not require any additional optical filter and can be implemented at low costs.

According to an embodiment of the invention, the optical filter device can be realized as a wavelength division multiplexer means, which is adapted to optically filter multiplex a plurality of modulated optical output signal. That is, in an optical WDM transmission system or an optical WDM transmitter device, respectively, the multiplexer means may simultaneously be used as an optical band-pass filter for filtering a modulated optical output signal that is created according to the present invention in order to obtain the desired optical binary digital transmit signal (including the mode hopping modulation) to be supplied to an optical transmission link. Of course, the multiplexer means must reveal a suitable band-pass filtering characteristic.

An optical transmitter device according to the invention comprises at least one optical transmitter configured to operate in or configured to be controllable to operate in a mode-hopping state, in which mode hopping occurs between a predefined first and a predefined second optical mode of the optical transmitter depending on a first and a second state of a binary digital modulation signal supplied to the at least one optical transmitter, and a control device supplying a dedicated binary digital modulation signal to each of the at least one optical transmitters, wherein each of the at least one optical transmitters and the control device are configured to create a modulated optical output signal corresponding to the binary digital modulation signal, wherein a first state of the binary digital modulation signal leads to a modulated optical output signal at a center wavelength of the first optical mode and a second state of the binary digital modulation signal leads to an optical output signal at a center wavelength of the second optical mode. The optical transmitter device further comprises at least one optical filter device configured to optically filter each of the at least one modulated optical output signals in such a way that at least a portion of the optical power spectrum of the modulated optical output signal caused by a selected one of the first and second optical modes is suppressed or at least substantially attenuated.

A suitable optical transmitter may be configured to operate, without the need of supplying additional control signals, in a mode-hopping state, whenever a suitable binary digital modulation signal is supplied to the at least one optical transmitter. However, in many cases, it will be necessary to provide control signals to the optical transmitter in order to establish a mode-hopping state. Of course, one or more control signals may be comprised within the binary digital modulation signal supplied to the optical transmitter. For example, the modulation signal may be a modulation current including a bias current for adjusting the operation point of a semiconductor laser that is used as an optical transmitter.

The control device may not only be configured to provide a dedicated binary digital modulation signal, but also dedicated control signals for establishing the mode-hopping state to each of the at least one optical transmitters. In case of an optical transmitter device comprising more than one optical transmitter, the control device may be realized as a single central device or as a distributed device comprising a respective number of sub-devices, each of which is assigned to one of the optical transmitters. A central control device may comprise a first sub-device for creating and/or supplying the control signal(s) to the optical transmitters and a second sub-device for creating and/or supplying the binary digital modulation signals to the optical transmitters. In the same way, the sub-devices of a distributed control device may be realized, i.e. each sub-device comprises a first sub-device for creating and/or supplying the control signal to the respective optical transmitters and a second sub-device for creating and/or supplying the binary digital modulation signal to the respective optical transmitters.

According to an embodiment of the invention, the at least one optical transmitter is a tunable optical transmitter and the control device is configured to supply at least one state control signal to the at least one optical transmitter, wherein the at least one control signal controls the at least one optical transmitter to operate in a predefined mode hopping state, in which mode hopping occurs between a predefined first and a predefined second optical mode having a first and a second center wavelength, respectively.

The tunable optical transmitter may be or may comprise a tunable semiconductor laser, preferably a semiconductor laser having a multi-section structure, such as a distributed feed-back (DFB) laser, a distributed Bragg reflector (DBR) laser, a sampled grating DBR (SG-DBR) laser or a Y-branch laser etc.

An optical WDM transmitter device according to the present invention comprises a plurality of optical transmitters, each creating a respective modulated optical output signal, each of which having an optical power spectrum comprising a peak at a center wavelength of a respective mode, which is different from the center wavelengths of the two modes of any of the other modulated optical output signals. The optical filter device of such an optical WDM transmitter device may comprise a separate optical filter for each of the at least one optical transmitters, wherein each optical transmitter and each dedicated optical filter are configured to create a respective optical binary digital transmit signal at a predetermined center wavelength differing from the center wavelengths of the optical binary digital transmit signals created by any other pair of an optical transmitter and a dedicated optical filter. The filtered optical binary digital transmit signals. i.e. the optical binary transmission digital signals, are supplied to an optical multiplexer device, which is configured to combine these signals to an optical WDM transmit signal. As a separate optical filter is provided for filtering the respective modulated optical output signal and each of the optical binary digital transmit signals is supplied to a dedicated channel port of an optical multiplexer device, the optical multiplexer device may be realized as a simple optical combiner device, i.e. a 1×N optical splitter/combiner, which outputs the optical WDM transmit signal at a WDM port.

According to a further embodiment, an optical WDM transmitter device comprising a plurality of optical transmitters may comprise an optical filter device that is realized as an optical multiplexer and filter device, which is configured to create an optical WDM transmit signal by filtering and simultaneously combining the modulated optical output signals created by the optical transmitters and supplied to respective dedicated channel ports of the optical filter device. Of course, also in this embodiment, the optical WDM transmit signal comprises a plurality of filtered modulated optical output signals, which are created by the plurality of optical transmitters, as optical channel signals.

Such an optical multiplexer and filter device may be realized as an arrayed waveguide grating or any other device having the functionality of an arrayed waveguide grating.

In another embodiment, the least one optical transmitter comprises an electrical high-pass filter configured to electrically high-pass filter the binary digital modulation signal before it is supplied to the tunable semiconductor laser. Using a high-pass filter in such a way results in a desired steep increase or decrease of the filtered binary digital modulation signal that is supplied to the tunable semiconductor laser and thus to a shortened transition time between the two modes.

BRIEF DESCRIPTION OF THE DRAWINGS

Further objects and advantages of the present invention will become apparent from the following description of a preferred embodiment that is given by way of example with reference to the accompanying drawings, wherein.

DETAILED DESCRIPTION OF THE INVENTION

As the invention is based on a modulating method that intentionally uses mode hopping, which occurs in optical transmitters, especially in tunable optical transmitters like DFB, DBR or Y-branch semiconductor lasers, this modulation method, which is, for example, known from U.S. Pat. No. 5,243,608, shall be briefly explained with reference to FIGS. 1 to 3b.

Figure 1:
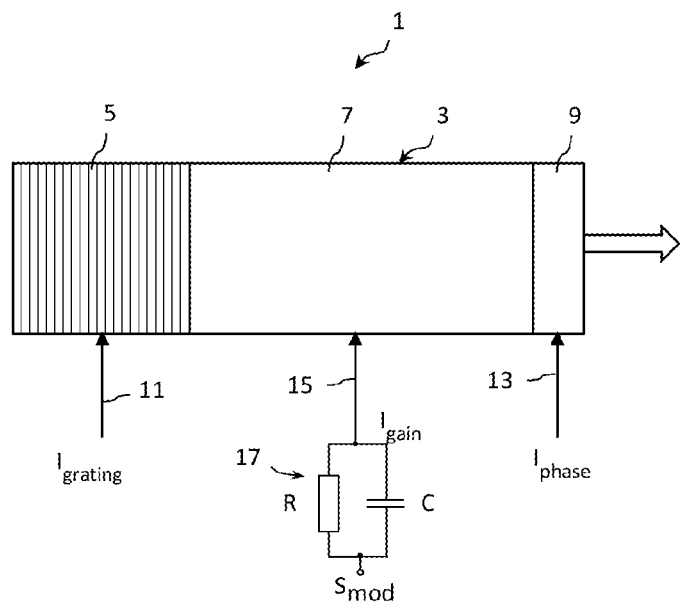
FIG. 1 shows a schematic representation of the structure of a tunable semiconductor laser.

FIG. 1 schematically shows a block diagram of the structure of an optical transmitter element 1 in the form of a widely tunable semiconductor laser 3. This semiconductor laser 3 comprises a broadband grating section 5, a gain section 7 and a front reflector section 9, which define the phase matching condition of the laser cavity. The broadband grating section 5, which realizes a rear reflector of the laser cavity, is a broadband grating having a spectral reflectivity according to the dashed line in FIG. 2a. The spectral reflectivity of the broadband grating section 5 reveals a peak at a predetermined wavelength. This peak wavelength can be shifted by supplying a first control signal 11 to the broadband grating section 5 in the form of a grating current $I_{grating}$ having a predetermined value or state. Varying the control signal 11 within a predetermined range causes a shift of the peak wavelength within a corresponding large wavelength range. Accordingly, the center wavelength of an optical signal created by the optical transmitter element 1 can be controlled to reach a predetermined value within a given wavelength range by supplying a control signal 11 having a corresponding predetermined value or, generally speaking, having a corresponding predetermined state.

The front reflector section 9 is configured in such a way that it influences the phase matching condition of the laser cavity depending on a second control signal 13 in the form of a phase current $I_{phase}$ supplied to the front reflector section. The filter function of the laser cavity, which is determined by the state of the front section, is depicted as solid line in FIG. 2a. This comb-shaped filter function reveals a plurality of peaks essentially having the same height and an essentially constant frequency separation. Each center wavelength of a peak of this filter function corresponds to a longitudinal mode of the optical transmitter element 1. The phase spectrum of this filter function can be shifted in a desired manner by supplying a control signal 13 having a predetermined value or, generally speaking, a predetermined state. Thus, in the embodiment shown in FIG. 1, the (spectral) filter function according to the solid line can be shifted in a desired manner by supplying a grating current $I_{phase}$ having a predetermined value or, generally speaking, a predetermined state.

Figure 2A:
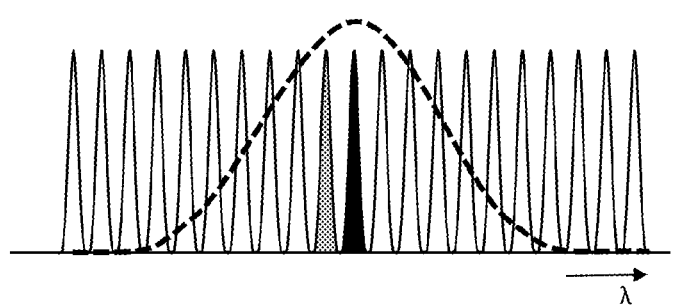
FIGS. 2a and 2b show the individual optical spectra (FIG. 2a) and the combined spectrum (FIG. 2b) of the broadband grating and the narrowband grating defining the phase matching condition of the semiconductor laser in FIG. 1 in a first state, additionally defined by a first state of the gain current.
Figure 2B:
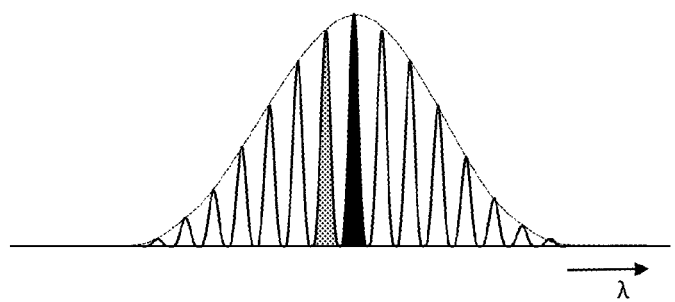
Figure 3A:
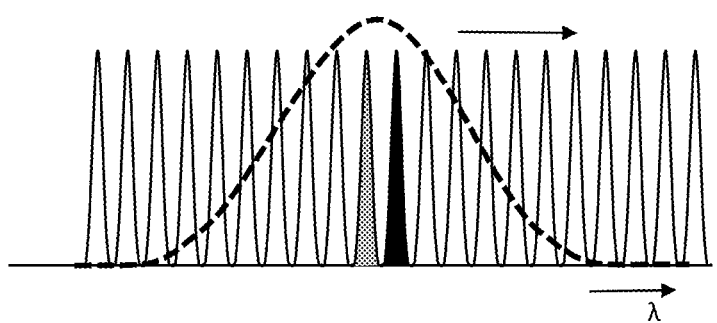
FIGS. 3a and 3b show the individual optical spectra (FIG. 3a) and the combined spectrum (FIG. 3b) of the broadband grating and the narrowband grating defining the phase matching condition of the semiconductor laser in FIG. 1 in a second state, additionally defined by a second state of the gain current.
Figure 3B:
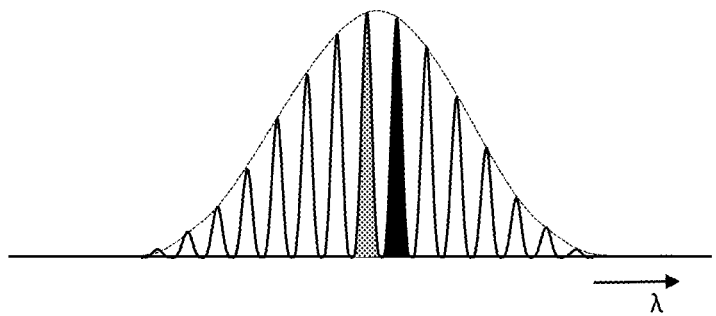

FIG. 2b shows the combined spectral reflections of the broadband grating section 5 and the front reflector section 9, which approximately corresponds to the products of the two single spectra.

The center wavelength of the optical signal created by the optical transmitter element 1 or the semiconductor laser 3, respectively, corresponds to the longitudinal mode of the optical transmitter element 1 which is best reflected. That is, the center wavelength of the optical signal created corresponds to the center wavelength of the longitudinal mode having the highest peak in the combined reflectivity curve shown by the solid line in FIG. 2b (the dashed line in FIG. 2b, on which the peak points lie, essentially corresponds to the spectral reflectivity of the broadband grating section 5 in FIG. 2a).

Thus, in the first state of the optical transmitter element 1 defined by a respective first value or state of the first and second control signals 11, 13 (i.e. a first value or state of the currents $I_{grating}$ and $I_{phase}$) and shown in FIGS. 2a and 2b, the optical transmitter element 1 emits at a wavelength corresponding to the center wavelength of the peak shown in black, which, in this state, corresponds to the longitudinal mode which is reflected with the maximum combined reflectivity at the rear and front sections 5, 9.

As the phase is not only determined by the second control signal 13 that is supplied to the front reflector section 9 but also by the value of a gain signal 15 (e.g. a gain current $I_{gain}$ in case of the semiconductor laser 3 shown in FIG. 1), the filter function according to the solid line in FIGS. 2a and 2b are shifted if the gain signal changes its value or, generally speaking, its state. As apparent from FIGS. 2a-3b, the gain signal has changed its value or state in such a way that the filter function (again shown as a solid line in FIG. 3b) is shifted to the right (indicated by the arrow in FIG. 3a), whereas the spectral reflectivity of the broadband grating section 5 (again shown as a dashed line in FIG. 3a) remains unchanged.

This leads to a state of the optical transmitter element 1 or the semiconductor laser 3, respectively, resulting in a maximum combined reflectivity for the next lower mode corresponding to the peak shown in gray. That is, in this state the optical transmitter element 1 emits radiation at a center wavelength of the neighboring lower mode.

Thus, a change between two modes depending on two corresponding differing states of a binary digital modulation signal may be used to modulate the center wavelength of the optical signal created by the optical transmitter element 1. This binary digital modulation signal may be supplied to the optical transmitter element 1 as a gain current $I_{gain}$. Additionally, the gain current $I_{gain}$ may include, especially as an additive component, a current for controlling the operating point of the optical transmitter element 1 or the semiconductor laser 3, respectively.

Such a modulated optical output signal of the optical transmitter element 1 may be supplied to an optical transmission link. The signal may be directly detected after optically filtering the optical signal in such a way that the spectral portion or the spectral components created at a selected mode are essentially suppressed.

Figure 4:
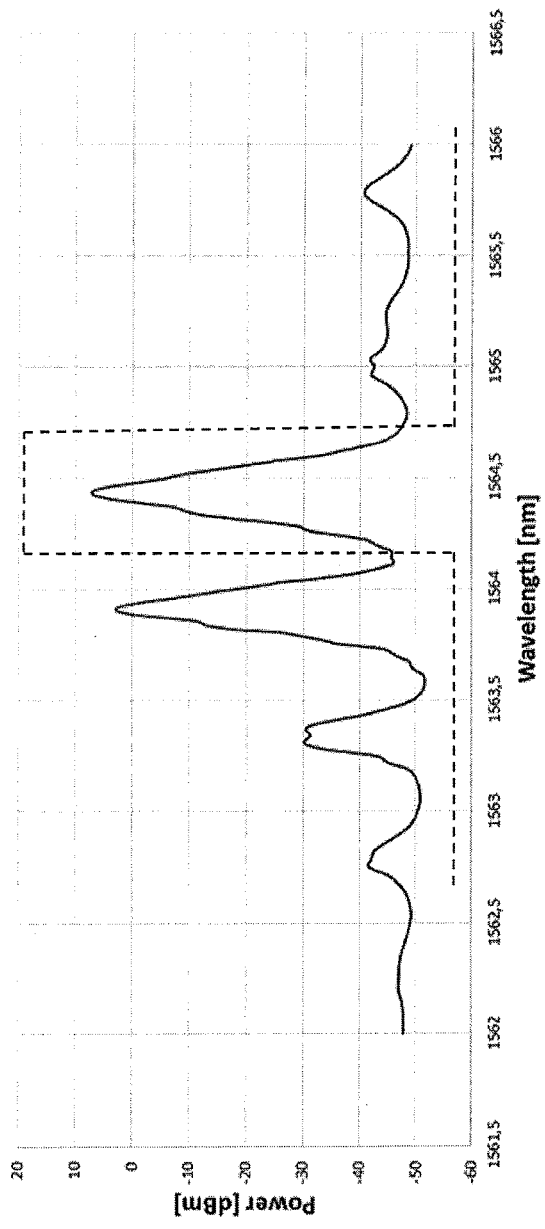
FIG. 4 shows the optical spectrum of the modulated signal created by an optical transmitter operating according to the present invention before the optical filtering is effected.

However, this modulated signal has a spectral power density as exemplarily shown in FIG. 4. This optical spectrum essentially reveals two peaks around the center wavelengths of the two modes that are used for the mode hopping modulation. Naturally, both spectral ranges around these peaks comprise the full information included in the binary digital modulation signal as each of the peaks either corresponds to the mark bits (i.e. 1 bits) or the space bits (i.e. 0 bits) thereof.

As the mark bits of the modulated signal are usually created by a higher level of the gain current that is supplied to the respective optical transmitter (e.g. to a multi-section semiconductor laser) than the space bits, it would generally be possible to directly detect this signal as the optical power of the mark bits is higher than the optical power of the space bits. However, the extinction ratio can be increased if the selected one of the spectral ranges surrounding the center wavelengths of the respective two modes is suppressed or attenuated in such a way that the optical power included in a signal portion representing a space (or mark) bit is sufficiently lower than the optical power included in a signal portion representing a marked (or space) bit.

According to the transmission process and system disclosed in U.S. Pat. No. 5,243,608, an optical bandpass filter is used at the receiver side in order to increase the extinction ratio. As a function of whether this optical filter is tuned on one of the two center wavelengths of the two modes, the filter output signal corresponds either to the binary digital modulation signal or to its complement, i.e. to the inverted binary digital modulation signal. As the two signals represented by the two peaks of the optical power spectrum of the modulated signal (exemplarily shown in FIG. 4) are complementary signals, the peak having the lower peak value corresponds to the complementary signal having a lower extinction ratio than the respective other complementary signal. It is therefore generally advantageous to choose the filter bandwidth of the bandpass filter in such a way that the spectral range surrounding the peak having the lower peak value is suppressed or sufficiently attenuated.

Thus, in the exemplary optical power spectrum of a modulated optical signal shown in FIG. 4, an optical bandpass filter should be designed in such a way that the spectral peak having a center wavelength of approximately 1564.4 nm revealing the higher peak value is passed through. Of course, the filter bandwidth should be selected in such a way that the signal portions created by the modulation (generally both sidebands) are also passed through.

Figure 5:
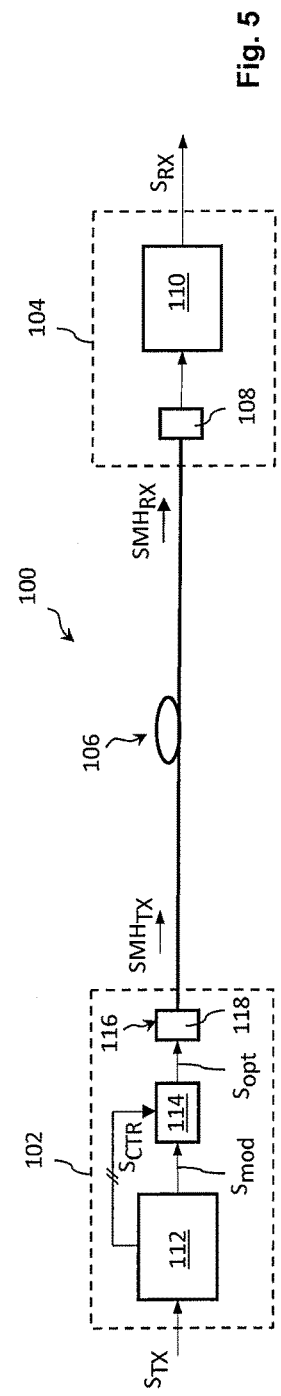
FIG. 5 shows a schematic block diagram of an embodiment of an optical transmission system comprising an optical WDM transmitter device according to the invention including a single optical transmitter.

FIG. 5 shows an optical single-channel transmission system 100 comprising a (single-channel) optical transmitter device 102 and a (single channel) optical receiver device 104, which are connected to a respective end of an optical transmission link 106 that may be realized as an optical fiber, for example a standard single-mode fiber.

The optical transmitter device 102 is configured to receive a digital transmit signal $S_{TX}$ at an input port thereof and to create an optical binary digital transmit signal $SMH_{TX}$, (including the information of the digital transmit signal $S_{TX}$), which is supplied to the respective end of the optical transmission link 106. This optical binary digital transmit signal $SMH_{TX}$ is transmitted from the near and of the optical transmission link 106 to the far end thereof and is received at the far end by the receiver device 104 as an optical binary digital receive signal $SMH_{RX}$.

The receiver device 104 is configured to directly receive the optical binary digital receive signal $SMH_{RX}$ that is supplied to an input port thereof. The optical receiver device 104 comprises an opto-electrical converter 108, such as a photodiode, and a signal processing unit 110. The optoelectrical converter 108 converts the optical transmit signal received $S_{RX}$ into a respective electrical receive signal. The electrical receive signal is supplied to the input port of the signal processing unit 110 for further processing. This further processing may include signal regeneration in order to create a digital receive signal $S_{RX}$ including the information that has been transmitted. Of course, the optical transmitter device 102 may be adapted to receive an electrical or optical transmit signal $S_{TX}$ at a respective input port. Likewise, the receiver device 104 may be configured to output the receive signal $S_{RX}$ in the form of an electrical or optical signal.

The optical transmitter device 102 comprises a control device 112, an optical transmitter element 114 and an optical filter device 116 comprising an optical bandpass filter 118. The control device 112 is configured to control the optical transmitter in such a way that it operates in a mode hopping state, in which mode hopping occurs between a predefined first and a predefined second optical mode of the optical transmitter if a binary digital modulation signal $S_{mod}$ is supplied to the optical transmitter element 114. For this purpose, the control device 112 creates one or more control signals $S_{CTR}$, which are supplied to the optical transmitter element 114. As described above, the optical transmitter element 114 may be realized or may comprise a multi-section structure semiconductor laser 1 and the control signals may comprise a first control signal 11 in the form of a grating current $I_{grating}$ and a second control signal 13 in the form of a phase current $I_{phase}$. A further, third control signal may be comprised by a modulation signal $S_{mod}$, which is supplied to a modulation port of the optical transmitter element 114. As apparent from the above explanations, a constant or controllably and slowly varying portion or component of the gain current $I_{gain}$ am may determine the operating point and thus also the mode hopping state of the optical transmitter device 114. A further portion or component of the gain current $I_{gain}$ am constitutes the desired binary digital modulation signal $S_{mod}$.

Thus, according to the terminology used throughout this description, the control signals are designated by the reference sign $S_{CTR}$ irrespective of whether a specific control signal is separately supplied to the transmitter 114 or as a component of the binary digital modulation signal $S_{mod}$ and the reference sign $S_{mod}$ designates the binary digital modulation signal irrespective of whether this signal, in addition to a mere modulation component, comprises a component which constitutes a control signal.

The control signals $S_{CTR}$ and the binary digital modulation signal $S_{mod}$ cause the optical transmitter element 1 and 14 to create a modulated optical output signal $S_{opt}$ having an optical spectrum comprising signal portions caused by both modes (as exemplarily shown in FIG. 4). According to the invention, the optical filtering of the modulated optical output signal $S_{opt}$ is already effected at the transmitter side. The optical filter device 116 is designed as explained above. The optical binary digital transmit signal $SMH_{TX}$ supplied to the optical transmission link 106 merely comprises a selected one of the two complementarity signals included in the modulated optical output signal $S_{opt}$.

Thus, the optical spectrum of the optical binary digital transmit signal $SMH_{TX}$ merely comprises the spectral portion which is necessary in order to recover a receive signal $S_{RX}$ corresponding to the binary digital modulation signal $S_{mod}$. The optical spectrum of the optical binary digital transmit signal $SMH_{TX}$ is decisively narrower than the optical spectrum of the modulated optical output signal $S_{opt}$.

This leads to a decisively increased dispersion tolerance as the dispersion, especially the chromatic dispersion, of the optical transmission link 106 cannot lead to a broadening of the spectral portion of the suppressed partial signal, which would lead (as in the prior art according to U.S. Pat. No. 5,243,608) to a deterioration of the selected partial signal (corresponding to the selected spectral range defined by the optical filter device 116).

Figure 6:
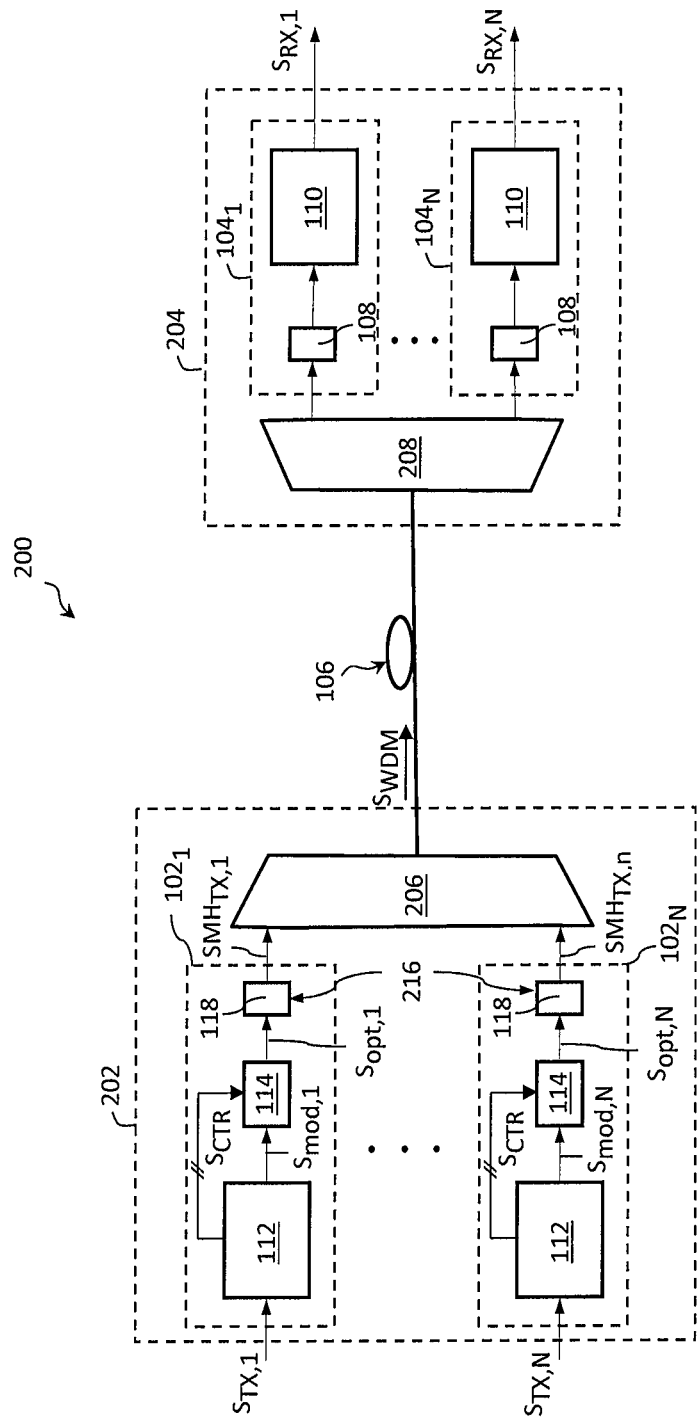
FIG. 6 shows a schematic block diagram of an embodiment of an optical WDM transmission system comprising an optical WDM transmitter device according to the invention including a plurality of optical transmitters and a separate optical filter for each optical transmitter.

FIG. 6 shows an optical WDM transmission system 200 comprising a plurality of N optical transmitter devices $102_i$ ($1 \leq i \leq N$) forming a WDM transmitter device 202 and a corresponding plurality of N receiver devices $102_i$ ($1 \leq i \leq N$) forming a WDM receiver device 204. Each of the optical transmitter devices $102_i$ reveals a design according to the single channel transmission system shown in FIG. 5. The same applies to the receiver devices $102_i$. The N optical transmitter devices $102_i$ are connected to dedicated channel ports of a multiplexer device 206, which combines the optical binary digital transmit signals $SMH_{TX,i}$ created by the optical transmitter devices $102_i$ to an optical WDM transmission signal. The optical WDM transmission signal $S_{WDM}$ is supplied to the transmission link 106 and transmitted to the far end of the transmission link 106, which is connected to a demultiplexer device 208.

For reasons of simplicity, the components of the transmitter devices $102_i$ are designated without a respective index i, despite the fact that each of the receivers is configured to create, as an optical channel signal, an optical binary digital transmit signal $SMH_{TX,i}$ having a different center frequency. That is, each of the optical transmitters 114 emits at two center wavelengths (two different modes), wherein the selected one of each of these two modes differs in its center frequency from the center frequency of the selected mode of a respective neighboring channel. The optical transmitters 114 may be realized as or may comprise identical widely tunable semiconductor lasers, which are controlled to emit at two modes depending on a dedicated binary digital modulation signal $S_{mod,i}$.

As the optical filter device 216 of the WDM transmitter device 202 comprises a separate optical filter 116 for each optical transmitter (or optical channel), the multiplexer device 206 may be realized by a simple 1×N optical coupler. Of course, each of the optical bandpass filters 118 has a bandwidth and a center wavelength, i.e. a passband, according to a predetermined definition of the channels of the WDM transmission system 200.

Figure 7:
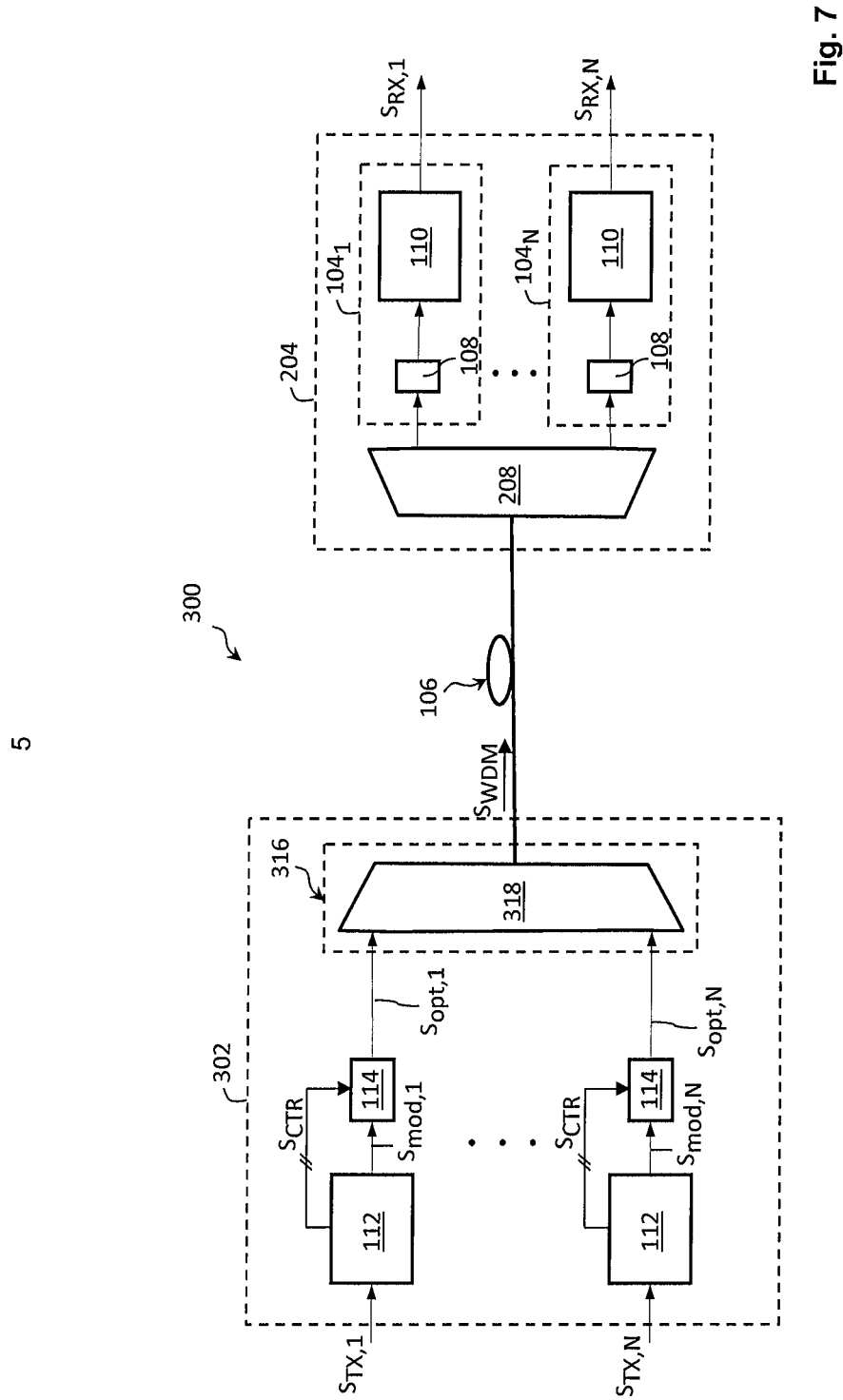
FIG. 7 shows a schematic block diagram of an embodiment of an optical WDM transmission system similar to the system in FIG. 6, wherein the filter device and the multiplexer device are realized by an arrayed waveguide grating.

FIG. 7 shows a further embodiment of a WDM transmission system 300 similar to the embodiment according to FIG. 6. Thus, identical components are designated by identical reference signs. The decisive difference between these embodiments is that the optical transmitter device 302 of the embodiment according to FIG. 7 comprises a filter device 316 which combines the functionality of filtering the modulated optical output signals $S_{opt,i}$ in order to create corresponding optical binary digital transmit signals $SMH_{TX,i}$ and to combine these signals to an optical WDM transmission signal $S_{WDM}$. This optical filter device 316 may be realized by an arrayed waveguide grating (AWG) 318.

As in a WDM transmission system the multiplexers in the form of AWGs are widely used in order to define the channel passbands, these AWGs may simultaneously be used in order to effect the desired bandpass filtering of the modulated optical output signals $S_{opt,i}$ created by the optical transmitters 114. That is, in order to realize the method and transmission system according to the present invention, no additional optical filter means are required.

As already mentioned above, the mode hopping effect is essentially caused or influenced by two parameters, which also depend on the gain current $I_{gain}$, namely the temperature and the charge carrier density in the active region of the semiconductor laser 3. Both parameters influence the phase. The "charge carrier effect" is dominant for higher bit rates, e.g. for bit rates above 4 to 6 Gbit/s depending on the design of the semiconductor laser. The "temperature effect" is dominant in for lower bit rates, e.g below 4 to 6 Gb/s.

As shown in FIG. 1, an electrical high-pass filter 17 may be provided at the input port of the semiconductor laser 3. Of course, also all or selected ones of the optical transmitters 114 in the systems 100, 200 and 300 as shown in FIGS. 5, 6 and 7 may comprise an electrical high-pass filter at the respective input ports of the semiconductor lasers comprised by the optical transmitters 114. The high-pass filter 17 enables a steep increase or decrease of the gain current $I_{gain}$ at the transitions in the binary digital modulation signal $S_{mod}$. As shown in FIG. 1, the high-pass filter 17 may be realized as a simple RC high-pass filter, comprising a resistance R which is connected parallel to a capacitance C.

LIST OF REFERENCE SIGNS 1 optical transmitter element
3 semiconductor laser
5 broadband grating section
7 gain section
9 front reflector section
11 first control signal (grating current $I_{grating}$)
13 second control signal (phase current $I_{phase}$)
15 gain signal ($I_{gain}$)
17 electrical high-pass filter
100 single-channel optical transmission system
102 (single-channel) optical transmitter device
104 (single channel) optical receiver device
106 transmission link
108 opto-electrical converter
110 signal processing unit
112 control device
114 optical transmitter
116 optical filter device
118 optical bandpass filter
200 optical WDM transmission system
202 WDM transmitter device
204 WDM receiver device
206 multiplexer device
208 demultiplexer device
216 filter device
300 optical WDM transmission system
302 WDM transmitter device
316 optical filter device
318 arrayed waveguide grating
$I_{grating}$ grating current
$I_{phase}$ phase current
$I_{gain}$ gain current
$S_{TX,i}$ transmit signal
$S_{RX,i}$ receive signal
$S_{opt,i}$ modulated optical output signal
$SMH_{TX,i}$ optical binary digital transmit signal
$SMH_{RX,i}$ optical binary digital receive signal
$S_{mod,i}$ modulation signal

The invention claimed is:

1. A method for creating an optical binary digital transmit signal to be supplied to an optical transmission link comprising:

(a) operating an optical transmitter in such a state that mode hopping occurs between a predefined first and a predefined second optical mode of the optical transmitter if a binary digital modulation signal is supplied to the optical transmitter,
(b) creating a modulated optical output signal of the optical transmitter corresponding to the binary digital modulation signal supplied to the optical transmitter, wherein a first state of the binary digital modulation signal ($S_{mod}$) leads to a modulated optical output signal at a center wavelength of the first optical mode and a second state of the binary digital modulation signal leads to a modulated optical output signal at a center wavelength of the second optical mode,
(c) optically filtering the modulated optical output signal in such a way that at least a portion of the optical power spectrum of the modulated optical output signal caused by a selected one of the first and second optical modes is suppressed or attenuated, and
(d) outputting the optically filtered modulated output signal to a transmission link.

2. The method according to claim 1, wherein the optical mode causing a lower peak in the optical power spectrum is selected for effecting the optical filtering of the modulated optical output signal.

3. The method according to claim 1, wherein for optically filtering the modulated optical output signal, an optical filter device is used which defines a channel bandwidth of the optical transmission link that is assigned to the optical binary digital transmit signal.

4. The method according to claim 1, wherein the binary digital modulation signal is electrically high-pass filtered before it is supplied to a tunable semiconductor laser comprised by the optical transmitter.

5. The method of claim 1, wherein the optical transmitter link is an optical wavelength division (WDM) transmission link.

6. The method according to claim 2, wherein for optically filtering the modulated optical output signal, an optical filter device is used which defines a channel bandwidth of the optical transmission link that is assigned to the optical binary digital transmit signal.

7. The method according to claim 2, wherein the binary digital modulation signal is electrically high-pass filtered before it is supplied to a tunable semiconductor laser comprised by the optical transmitter.

8. The method according to claim 3, wherein the optical filter device is a wavelength division multiplexer means, which is adapted to optically filter and multiplex a plurality of modulated optical output signal.

9. An optical transmitter device for creating at least one optical binary digital transmit signal to be supplied to an optical transmission link comprising:

(a) at least one optical transmitter configured to operate in or configured to be controllable to operate in a mode-hopping state, in which mode hopping occurs between a predefined first and a predefined second optical mode of the optical transmitter depending on a first and a second state of a binary digital modulation signal supplied to the at least one optical transmitter, and
(b) a control device supplying a dedicated binary digital modulation signal to each of the at least one optical transmitters,
(c) wherein each of the at least one optical transmitters and the control device are configured to create a modulated optical output signal corresponding to the binary digital modulation signal, wherein a first state of the binary digital modulation signal leads to a modulated optical output signal at a center wavelength of the first optical mode and a second state of the binary digital modulation signal leads to a modulated optical output signal at a center wavelength of the second optical mode, wherein (d) the optical transmitter device further comprises an optical filter device configured to optically filter each of the at least one modulated optical output signals in such a way that at least a portion of the optical power spectrum of the modulated optical output signal caused by a selected one of the first and second optical modes is suppressed or attenuated.

10. The optical transmitter device according to claim 9, wherein the control device is configured to supply at least one state control signal to the at least one optical transmitter, wherein the at least one control signal controls the at least one optical transmitter to operate in the mode hopping state.

11. The optical transmitter device according to claim 9, wherein
(a) the optical transmitter device comprises a plurality of optical transmitters,
(b) the optical filter device comprises a separate optical filter for each of the at least one optical transmitters, wherein each optical transmitter and each dedicated optical filter are configured to create an optical binary digital transmit signal at a predetermined center wavelength, and
(c) the optical binary digital transmit signals are supplied to an optical multiplexer device, which is configured to combine the optical binary digital transmit signals to an optical WDM signal.

12. The optical transmitter device according to claim 9, wherein
(a) the optical transmitter device comprises a plurality of optical transmitters and
(b) the optical filter device is realized as an optical multiplexer and filter device, which is configured to create an optical WDM signal by filtering and combining the modulated optical output signals, which are created by the optical transmitters and supplied to the optical filter device.

13. The optical transmitter device of claim 9, wherein the optical transmission link is an optical wavelength division multiplex transmission link.

14. The optical transmitter device according to claim 10, wherein the at least one optical transmitter is a tunable optical transmitter and that the control device is configured to supply at least one state control signal to the at least one optical transmitter, wherein the at least one state control signal controls the at least one optical transmitter to operate in a predefined mode hopping state, in which mode hopping occurs between a predefined first and a predefined second optical mode having a first and a second center wavelength, respectively.

15. The optical transmitter device according to claim 10, wherein
(a) the optical transmitter device comprises a plurality of optical transmitters,
(b) the optical filter device comprises a separate optical filter for each of the at least one optical transmitters, wherein each optical transmitter and each dedicated optical filter are configured to create an optical binary digital transmit signal at a predetermined center wavelength, and
(c) the optical binary digital transmit signals are supplied to an optical multiplexer device, which is configured to combine the optical binary digital transmit signals to an optical WDM signal.

16. The optical transmitter device according to claim 12, wherein the optical filter device is realized by an arrayed waveguide grating.

17. The optical transmitter device according to claim 14, wherein the tunable optical transmitter comprises a tunable semiconductor laser.

18. The optical transmitter device according to claim 14, wherein
(a) the optical transmitter device comprises a plurality of optical transmitters,
(b) the optical filter device comprises a separate optical filter for each of the at least one optical transmitters, wherein each optical transmitter and each dedicated optical filter are configured to create an optical binary digital transmit signal at a predetermined center wavelength, and
(c) the optical binary digital transmit signals are supplied to an optical multiplexer device, which is configured to combine the optical binary digital transmit signals to an optical WDM signal.

19. The optical transmitter device according to claim 17, wherein the least one optical transmitter comprises an electrical high-pass filter configured to electrically high-pass filter the binary digital modulation signal before it is supplied to the tunable semiconductor laser.

20. The optical transmitter device of claim 17, wherein the tunable semiconductor laser is a semiconductor laser comprising a multi-section structure.

21. A method for creating an optical binary digital transmit signal to be supplied to an optical transmission link comprising:
(a) operating an optical transmitter in such a state that mode hopping occurs between a predefined first and a predefined second optical mode of the optical transmitter if a binary digital modulation signal ($S_{mod}$) is supplied to the optical transmitter,
(b) creating a modulated optical output signal ($S_{opt}$) of the optical transmitter corresponding to the binary digital modulation signal ($S_{mod}$) supplied to the optical transmitter, wherein a first state of the binary digital modulation signal ($S_{mod}$) leads to a modulated optical output signal ($S_{opt}$) at a center wavelength of the first optical mode and a second state of the binary digital modulation signal leads to a modulated optical output signal ($S_{opt}$) at a center wavelength of the second optical mode, wherein:
the optical transmitter comprises a tunable semiconductor laser,
the binary digital modulation signal ($S_{mod}$) is electrically high-pass filtered before it is supplied to the tunable semiconductor laser, and
the modulated optical output signal ($S_{opt}$) is optically filtered in such a way that at least a portion of the optical power spectrum of the modulated optical output signal ($S_{opt}$) caused by a selected one of the first and second optical modes is suppressed or attenuated and
(c) outputting the optically filtered modulated optical output signal (S) of the optical transmitter to a transmission link.

22. An optical transmitter device for creating at least one optical binary digital transmit signal to be supplied to an optical transmission link comprising:

(a) at least one optical transmitter configured to operate in or configured to be controllable to operate in a mode-hopping state, in which mode hopping occurs between a predefined first and a predefined second optical mode of the optical transmitter depending on a first and a second state of a binary digital modulation signal ($S_{mod}$) supplied to the at least one optical transmitter, and (b) a control device supplying a dedicated binary digital modulation signal ($S_{mod}$) to each of the at least one optical transmitters, (c) wherein each of the at least one optical transmitters and the control device are configured to create a modulated optical output signal ($S_{opt}$) corresponding to the binary digital modulation signal ($S_{mod}$), wherein a first state of the binary digital modulation signal ($S_{mod}$) leads to a modulated optical output signal ($S_{opt}$) at a center wavelength of the first optical mode and a second state of the binary digital modulation signal ($S_{mod}$) leads to a modulated optical output signal ($S_{opt}$) at a center wavelength of the second optical mode, wherein the least one optical transmitter comprises a tunable semiconductor laser, the least one optical transmitter comprises an electrical high-pass filter configured to electrically high-pass filter the binary digital modulation signal ($S_{mod}$) before it is supplied to the tunable semiconductor laser, and the optical transmitter device further comprises an optical filter device configured to optically filter each of the at least one modulated optical output signals ($S_{opt}$) in such a way that at least a portion of the optical power spectrum of the modulated optical output signal ($S_{opt}$) caused by a selected one of the first and second optical modes is suppressed or attenuated.

* * * * *

UNITED STATES PATENT AND TRADEMARK OFFICE
CERTIFICATE OF CORRECTION

PATENT NO. : 10,355,784 B2
APPLICATION NO. : 15/685141
DATED : July 16, 2019
INVENTOR(S) : Michael Eiselt et al.

Page 1 of 1

It is certified that error appears in the above-identified patent and that said Letters Patent is hereby corrected as shown below:

In the Claims

Column 14, Line 63, Claim 21, delete "(S)" and insert -- ($S_{opt}$) --

Signed and Sealed this
Twenty-fourth Day of September, 2019

Andrei Iancu
*Director of the United States Patent and Trademark Office*